March 18, 1958   J. H. BROWN, JR., ET AL   2,827,494
PREPARATION OF KETALS
Filed March 8, 1956
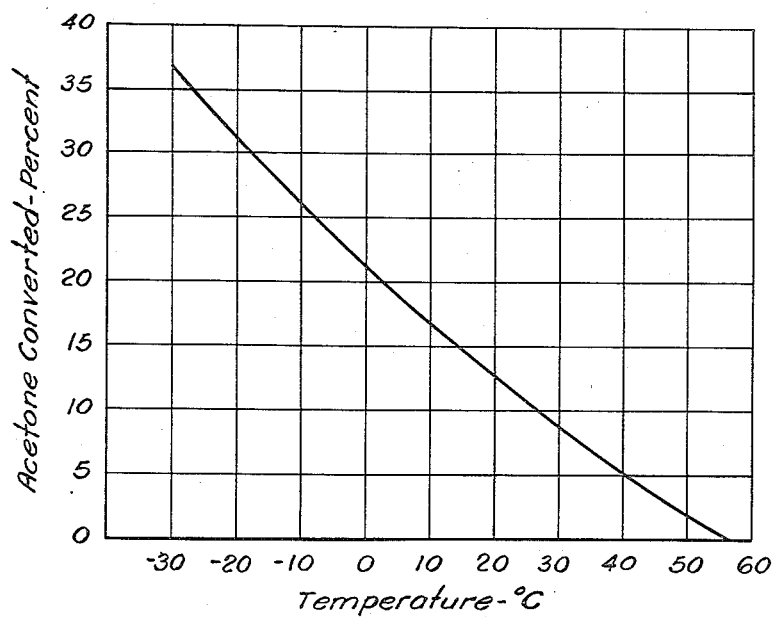
INVENTORS.
John H. Brown, Jr.
Nicholas B. Lorette
BY
Griswold & Burdick
ATTORNEYS

United States Patent Office 2,827,494
Patented Mar. 18, 1958

2,827,494

PREPARATION OF KETALS

John H. Brown, Jr., Freeport, and Nicholas B. Lorette, Lake Jackson, Tex., assignors to The Dow Chemical Company, Midland, Mich., a corporation of Delaware Application March 8, 1956, Serial No. 570,379

9 Claims. (Cl. 260—615)

This invention relates to a process for preparation of ketals, and more particularly to preparation of the ketals by reaction of aliphatic ketones with alcohols in the presence of cation exchange resins as catalyst.

2,2-dimethoxypropane and other ketals have recently been found to be effective additives for gasoline. In order to take advantage of this market and compete with other additives, ketals must be manufactured on a large scale and cheaply. The present methods for preparation of ketals by reaction of acetylene with alcohol or by the reaction of ketone with orthoformic ester use hard to obtain expensive raw materials and are not capable of producing these compounds on a competitive basis. This invention enables the production of the ketals by a simple and economical method using readily available inexpensive raw materials so that ketals thus produced are economically competitive with other additives. In the process, practically no secondary products are formed. By recycling the reactants, the only losses experienced are those inherent in the separation of the products.

This invention is also of great technical importance in that, heretofore, the lower ketals have not been prepared in commercially usable amounts by the additive reaction of an alcohol to the carbonyl group of a ketone. The addition reactions to the carbonyl group are well known. The presence of this group imparts certain unique properties and is responsible for the similarity in the additive reactions of aldehydes and ketones. Textbooks in organic chemistry point out this similarity and also point out the exception that while aldehydes will react with alcohol to form acetals, little success had been encountered in obtaining the corresponding reaction of lower ketones with alcohol to form ketals. Acids which would be expected to catalyze the formation of ketals are also catalysts for hydrolyzation of ketals to ketones and alcohols so that attempts to form ketal have been unsuccessful in that the reverse reaction or hydrolyzation was predominant.

According to the invention the ketal is prepared by reaction of ethanol or methanol with an aliphatic ketone having from 3 to 5 carbon atoms. A mixture of the alcohol and the ketone is contacted with a cation exchange resin in the acid state at a temperature ranging from —40 to 25° C. When equilibrium conditions are substantially obtained, the ion exchange resin is removed from contact with the mixture while the mixture is at the reaction temperature, and the ketal formed is recovered.

Cation exchange resin in the acid state is effective in catalyzing the reaction of an alcohol with a ketone to form ketal. It also serves as a catalyst in reversing the reaction. At low temperatures, an equilibrium between the forward and reverse reaction is established which favors the formation of ketal. At high temperatures, the reverse reaction becomes predominant and the ketal is converted to ketone and alcohol. This point is illustrated by the accompanying drawing which shows the equilibrium conversion of acetone to ketal as a function of temperature which was obtained in Example I, when a mixture of acetone and methanol containing a mole ratio of 4.55 moles of methanol per mole of acetone was contacted with a cation exchange resin. The abscissa represents the temperature in ° C. and the ordinate represents the percent conversion of the acetone to ketal. At temperatures above 55 or 60° C. practically no ketal was obtained while at —30° C. about 35 to 40 percent of the acetone was converted. At —34° C., conversions of acetone as high as 47.6 percent have been obtained. To obtain the ketal in practical quantities, it is essential to contact the mixture of ketone and alcohol with the cation exchange resin at a low temperature. When equilibrium is reached, the catalyst must be removed from the mixture at this low reaction temperature to prevent the reverse reaction which occurs at higher temperatures during the storage or recovery of the ketal.

The amount of ion exchange resin necessary to catalyze the formation of ketal may be very small. It may be added to the reactants and used in batch operation or more conveniently used by passing the reactants through a fixed bed of the resin. When the catalyst or hydrogen ions have been removed, ketal may be stored in the presence of water for days without any evidence of hydrolyzation. However, extremely low concentrations of catalyst or hydrogen ions will catalyze the reverse reaction, and the ketal yield will be reduced to the equilibrium conversion obtainable at the storage or the separation temperature. When a fixed bed is used, the mere passing there through of the reactants may create sufficient attrition to have minute particles carried out with the effluent, or sufficient acidity retained, to catalyze the reverse reaction. To be assured that there would be no residual hydrogen ions to effect the hydrolyzation, the effluent may be contacted with an anion exchange resin in the hydroxide form. For convenience, an ion exchange bed containing both resins may be used. The first ¾ of the bed can contain the cation resin which the reactants will contact first, and the remainder the anion. The residual hydrogen ions may also be removed by reaction with basic compounds, such as hydroxides of sodium, potassium, and calcium, which may be added to the effluent or the reaction products after they have been separated from the catalyst. The removal of the hydrogen ions by using ion exchange resin is much better since no additional constituents are added to the reaction products.

The cation exchange resins which may be used as catalyst are those which can be converted to the acid form. The sulfonic type, such as disclosed in United States Letters Patent Nos. 2,597,438, 2,500149 and 2,366,007 are preferred. The resins do not appear to lose activity as they are used. They may be contacted with reactants up to 400 times their volume without showing any decrease in activity or a loss in volume.

The anion exchange resins preferred for removal of any acidity that may be present in the effluent are the quaternary ammonium type anion exchange resins, such as described in United States Letters Patent Nos. 2,591,- 573, 2,614,099, 2,597,494, and 2,597,440. Other anion exchange resins in the basic form, such as those disclosed in United States Letters Patent Nos. 2,341,907, 2,546,- 938 and 2,591,574 may also be used.

In the reaction of ketones with alcohols which are catalyzed with cation exchange resin, the rate of reaction is relatively rapid and equilibrium conditions can be reached in comparatively a short time. The rate of reaction will vary with the resin used and will decrease as the reaction temperature is lowered. In actual operation, since contacting the reactants with resin for a longer time than necessary is not detrimental, a bed of sufficient size is provided, or the rate of reactants decreased sufficiently, to insure that equilibrium conditions are approximated. For operating temperatures of −40° to 25° C., the contact time used is from 5 to 15 minutes with the longer times being used for the lower temperatures. In the reaction the temperature is a critical factor. Higher conversions are obtained at lower temperatures, but the cost of refrigeraton increases rapidly as the temperatures are lowered. Thus, the most favorable economic conditions are attained at temperatures from −30° to 0° C.

The relative proportions of ketone and alcohol used are not critical and may be varied. Since in the reaction equilibrium conditions are desired, the percent conversion of one reactant can be increased by increasing the concentration of the second reactant in the reaction mixture. It is preferred to use an excess of alcohol. Usually, 4 to 6 moles of alcohol per mole of ketone are used. A greater ratio of alcohol to ketone, up to 20, may be used, but this large excess of alcohol is not desirable since this involves handling of large amounts of excess alcohol in the recovery of the products.

In the recovery of the ketal from the reaction mixture, simple distillation of the mixture is not effective. Close boiling azeotropes result and, when ketal is heated in the presence of water to the temperatures necessary for distillation, it will hydroylze to a limited extent even though no hydrogen ions are present to catalyze the reaction. The separation may be effected by the method disclosed by Bond and Klar in the co-pending application Serial Number 568,712, filed on March 1, 1956. In this method, the reaction products or effluent from the ion exchange bed is contacted with 10 to 30 percent caustic solution. The caustic solution will extract the other products in the effluent leaving a ketal stream containing over 80 weight percent ketal which can then be chemically dried and distilled to obtain the final product.

The following examples will further illustrate the invention.

Example I

The inner tube of an Allihn condenser, mounted vertically, was packed with 150 ml. of sulfonic type cation exchange resin of the type disclosed in United States Letters Patent No. 2,500,149, which had been converted to acid state by treatment with hydrochloric acid. The 150 ml. of resin gave a bed of about 30 cm. in depth. A mixture of methanol and acetone containing a mole ratio of 4.55 moles of alcohol per mole of acetone was passed through the bed at different temperatures at a rate of 10 to 15 ml. per minute. The effluent was collected and analyzed by infrared absorptiometry for weight percent of 2,2-dimethoxypropane. The following table gives the percent of 2,2-dimethoxypropane and the percent conversion of acetone obtained at the four temperatures that the reaction was run.

| Temperatures, ° C. | 2,2-di-methoxy-propane, weight percent | Acetone Converted, percent |
|---|---|---|
| 55-60 | 0 | 0 |
| 25 | 6.4 | 12.5 |
| 0 | 10 | 19.5 |
| −30 | 18 | 35.2 |

Example II

To show the effect that very small concentration of hydrogen ions will have on reversing the reaction, a test was run on the equipment described in Example I. The proportion of the reactants used was the same as in Example I and the temperature of reaction was maintained at a little above −30° C. The reactants were passed through the bed and effluent collected. A sample was taken. Part of the sample was immediately analyzed and found to contain about 16 percent by weight of 2,2-dimethoxypropane. The part of the sample that was not analyzed was allowed to remain at room temperature for one hour, when it was analyzed and found to contain only 8 percent ketal. After 2 hours the ketal concentration went down to about 5 percent or the equilibrium conversion obtainable at room temperature.

The above experiment was repeated and care was taken to see that no excessive agitation of the bed occurred when the reactants were passed therethrough. A sample was collected which was divided and analyzed as above. Analysis of the sample which was analyzed immediately was found to contain 16 percent of 2,2-dimethoxypropane. Analysis of a sample after one hour showed no apparent decrease in ketal. After being stored at room temperature for 209 hours, the concentration of ketal was found still to be 14.5 percent.

The ion exchange bed was modified by removing about one-fourth of the cation exchange resin and replacing this one-fourth with a quanternary ammonium type anion exchange resin of the type disclosed in United States Letters Patent No. 2,614,099. This anion exchange resin was in the hydroxide form. Using this modified bed, a test was run under identical conditions of the previous runs. An effluent containing 16 percent of 2,2-dimethoxypropane was obtained. Upon storing this product for 164 hours at room temperature, tests showed no decrease in ketal.

Example III

A mixture of methanol and methyl-ethyl ketone containing 4.3 moles of methanol per mole of ketone was passed through the cation exchange resin bed described in Example I at a rate of 20 ml. per minute and at −30° C.

The effluent was analyzed by infrared absorptiometry and found to contain 13.5 volume percent of 2,2-dimethoxybutane. The crude solution was extracted with 13 percent caustic. The caustic insoluble layer was diluted with petroleum ether, dried over sodium hydroxide pellets and distilled to recover the ketal.

Example IV

A mixture of ethanol and acetone containing 2.54 moles of ethanol per mole of acetone was passed through the cation exchange resin bed described in Example I at a rate of 10 to 15 ml. per minute and at −30° C.

The effluent was analyzed by infrared absorptiometry and found to contain 9 weight percent of 2,2-diethoxypropane. This represented an acetone conversion of 11.6 percent.

Example V

A pilot plant reactor, 2 feet in diameter and 6 feet in height, was filled with 14 cubic feet of resin of the type described in Example I. A mixture of methanol and acetone containing 81 weight percent methanol and 19 weight percent acetone was charged to the reactor at a rate of 452 pounds per hour. The temperature of the reactor was −34° C. and a contact time of 2.5 minutes was used.

The effluent was analyzed by infrared absorptiometry and found to contain 16.72 weight percent of 2,2-dimethoxypropane, 2.89 weight percent water, 70.40 weight percent methanol, and 9.99 weight percent acetone. This represented a 47.6 percent conversion of the acetone.

What is claimed is:

1. A process for preparation of a lower ketal by the reaction of an alcohol selected from the group consisting of ethanol and methanol and a saturated aliphatic ketone having from 3 to 5 carbon atoms as reactants, which comprises contacting said reactants with a cation exchange resin in the acid state at a temperature of −40 to 25° C. for a length of time sufficient to obtain substantially equilibrium conditions, and recovering the ketal.

2. A process for preparation of a lower ketal, which comprises intermixing an alcohol selected from the group consisting of ethanol and methanol and a saturated aliphatic ketone having from 3 to 5 carbon atoms, contacting said mixture with a cation exchange resin in the acid state at a temperature of —40 to 25° C. for a length of time sufficient to obtain substantially equilibrium conditions, separating the ion exchange resin from the contacted mixture at the reaction temperature, and recovering the ketal.

3. A process according to claim 2, wherein the ketone is acetone.

4. A process according to claim 2, wherein the ketone is methyl-ethyl ketone.

5. A process for preparation of 2,2-dimethoxypropane, which comprises intermixing methanol and acetone in a ratio of 2 to 20 moles of the alcohol per mole of acetone, contacting said mixture with a cation exchange resin in an acid state at a temperature from —40 to 25° C. for a length of time sufficient to obtain substantially equilibrium conditions, removing the ion exchange resin at reaction temperature, and recovering the ketal.

6. A process according to claim 5, wherein the ratio of methanol to acetone is in the range of 4 to 6 moles of alcohol per mole of acetone and the temperature is from —30 to 0° C.

7. A process for preparation of 2,2-dimethoxybutane, which comprises intermixing methanol and methyl ethyl ketone in a ratio of 2 to 20 moles of the alcohol per mole of the ketone, contacting said mixture with a cation exchange resin in the acid state at a temperature from —40 to 25° C. for a length of time to obtain substantially equilibrium conditions, removing the ion exchange resin at the reaction temperatures, and recovering the ketal formed.

8. A process according to claim 7, wherein the ratio of alcohol to methyl ethyl ketone is from 4 to 6 moles of methanol per mole of methyl ethyl ketone and the temperature is from —30 to 0° C.

9. A process for preparation of a lower ketal, which comprises intermixing an alcohol selected from the group consisting of ethanol and methanol and an aliphatic ketone having from 3 to 5 carbon atoms, contacting said mixture with a cation exchange resin in the acid state at a temperature of —40 to 25° C. for a length of time to obtain substantially equilibrium conditions, removing the cation exchange resin at the reaction temperature, removing the hydrogen ions, and recovering the ketal formed.

References Cited in the file of this patent
UNITED STATES PATENTS 2,566,559   Dolnick et al. _____ Sept. 4, 1951

OTHER REFERENCES

Brewster: Organic Chemistry (1948), p. 136.
Karrer: Organic Chemistry (1950), p. 174.
Fieser et al.: Organic Chemistry (1950), p. 217.